US011960242B2

(12) United States Patent
Yamawaki et al.

(10) Patent No.: US 11,960,242 B2
(45) Date of Patent: Apr. 16, 2024

(54) TONER

(71) Applicant: CANON KABUSHIKI KAISHA, Tokyo (JP)

(72) Inventors: Kentaro Yamawaki, Shizuoka (JP); Sara Yoshida, Shizuoka (JP); Yusuke Kosaki, Shizuoka (JP); Taiji Katsura, Shizuoka (JP); Hidekazu Fumita, Shizuoka (JP); Toshiya Kaino, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 17/498,910

(22) Filed: Oct. 12, 2021

(65) Prior Publication Data

US 2022/0121133 A1 Apr. 21, 2022

(30) Foreign Application Priority Data

Oct. 16, 2020 (JP) ................................ 2020-175016

(51) Int. Cl.
*G03G 9/097* (2006.01)
*G03G 9/08* (2006.01)

(52) U.S. Cl.
CPC ....... *G03G 9/09775* (2013.01); *G03G 9/0819* (2013.01); *G03G 9/0825* (2013.01); *G03G 9/0827* (2013.01)

(58) Field of Classification Search
CPC ............ G03G 9/09775; G03G 9/0819; G03G 9/0825; G03G 9/0827
See application file for complete search history.

(56) References Cited

U.S. PATENT DOCUMENTS 4,952,476 A 8/1990 Sakashita et al.
4,957,840 A 9/1990 Sakashita et al.
(Continued)

FOREIGN PATENT DOCUMENTS

JP 2009-36980 A 2/2009
JP 5223382 B2 6/2013
(Continued)

OTHER PUBLICATIONS

English machine translation of the description of JP-2018194837-A (Year: 2018).*
(Continued)

*Primary Examiner* — Peter L Vajda
*Assistant Examiner* — Boone Alexander Evans
(74) *Attorney, Agent, or Firm* — VENABLE LLP

(57) ABSTRACT

The present invention provides a toner that can maintain excellent transferability even when a transfer bias is low. The toner includes a toner particle that includes a toner base particle and a plurality of convex portions X existing on a surface of the toner base particle, wherein the convex portion X contains an organic silicon polymer; when a cross-section of the toner is observed with a scanning transmission electron microscope (STEM), and the convex portions X comprise a plurality of convex portions Y each having a convex height H of 40 nm or higher, a number ratio P (H/w) of the a number of the convex portions Y2 in which a ratio (H/w) of the convex height H to the convex width w is 0.33 or larger and 0.80 or smaller is 70% by number or more with respect to a total number of the convex portions Y.

4 Claims, 1 Drawing Sheet

(56) References Cited

U.S. PATENT DOCUMENTS

| | | | |
|---|---|---|---|
| 4,985,327 | A | 1/1991 | Sakashita et al. |
| 5,014,089 | A | 5/1991 | Sakashita et al. |
| 5,202,213 | A | 4/1993 | Nakahara et al. |
| 5,532,101 | A | 7/1996 | Nozawa et al. |
| 5,534,982 | A | 7/1996 | Sakaizawa et al. |
| 5,731,122 | A | 3/1998 | Yoshida et al. |
| 5,774,771 | A | 6/1998 | Kukimoto et al. |
| 5,915,150 | A | 6/1999 | Kukimoto et al. |
| 5,948,584 | A | 9/1999 | Hashimoto et al. |
| 5,998,080 | A | 12/1999 | Ohno et al. |
| 6,177,223 | B1 | 1/2001 | Hashimoto et al. |
| 6,214,509 | B1 | 4/2001 | Kasuya et al. |
| 6,300,024 | B1 | 10/2001 | Yusa et al. |
| 6,337,169 | B1 | 1/2002 | Hashimoto et al. |
| 6,528,224 | B2 | 3/2003 | Ohno et al. |
| 6,627,374 | B2 | 9/2003 | Fumita et al. |
| 6,696,211 | B2 | 2/2004 | Yoshida et al. |
| 6,806,016 | B2 | 10/2004 | Ohno et al. |
| 6,835,521 | B2 | 12/2004 | Tsuji et al. |
| 6,951,704 | B2 | 10/2005 | Tsuji et al. |
| 7,611,816 | B2 | 11/2009 | Tuji et al. |
| 8,043,781 | B2 | 10/2011 | Imafuku |
| 8,105,743 | B2 | 1/2012 | Ishii |
| 8,545,133 | B2 | 10/2013 | Fumita et al. |
| 8,916,319 | B2 | 12/2014 | Ikeda et al. |
| 8,940,467 | B2 | 1/2015 | Hashimoto et al. |
| 9,309,349 | B2 | 4/2016 | Watanabe et al. |
| 9,341,967 | B2 | 5/2016 | Tsujino et al. |
| 9,366,981 | B2 | 6/2016 | Yamawaki et al. |
| 9,429,860 | B2 | 8/2016 | Kinumatsu et al. |
| 9,632,441 | B2 | 4/2017 | Abe et al. |
| 9,658,554 | B2 | 5/2017 | Kinumatsu et al. |
| 9,720,340 | B2 | 8/2017 | Tominaga et al. |
| 9,733,583 | B2 | 8/2017 | Kuroki et al. |
| 9,798,256 | B2 | 10/2017 | Kosaki et al. |
| 9,798,262 | B2 | 10/2017 | Toyoizumi et al. |
| 9,811,016 | B2 | 11/2017 | Aoki et al. |
| 9,823,595 | B2 | 11/2017 | Toyoizumi et al. |
| 9,857,713 | B2 | 1/2018 | Kosaki et al. |
| 9,869,943 | B2 | 1/2018 | Aoki et al. |
| 9,897,933 | B2 | 2/2018 | Yoshida et al. |
| 10,054,866 | B2 | 8/2018 | Tanaka et al. |
| 10,114,303 | B2 | 10/2018 | Katsura et al. |
| 10,295,920 | B2 | 5/2019 | Nishikawa et al. |
| 10,303,074 | B2 | 5/2019 | Yamawaki et al. |
| 10,303,075 | B2 | 5/2019 | Tanaka et al. |
| 10,409,180 | B2 | 9/2019 | Koji et al. |
| 10,429,757 | B2 | 10/2019 | Yoshida et al. |
| 10,503,090 | B2 | 12/2019 | Tominaga et al. |
| 10,539,893 | B2 | 1/2020 | Tanaka et al. |
| 10,539,899 | B2 | 1/2020 | Nakamura et al. |
| 10,545,422 | B2 | 1/2020 | Yamawaki et al. |
| 10,635,010 | B2 | 4/2020 | Kamikura et al. |
| 10,635,011 | B2 | 4/2020 | Umeda et al. |
| 10,809,639 | B2 | 10/2020 | Yamawaki et al. |
| 10,942,465 | B2 | 3/2021 | Kototani et al. |
| 10,942,466 | B2 | 3/2021 | Tominaga et al. |
| 10,976,678 | B2 | 4/2021 | Yamawaki et al. |
| 10,976,679 | B2 | 4/2021 | Tanaka et al. |
| 11,003,104 | B2 | 5/2021 | Katsura et al. |
| 11,003,105 | B2 | 5/2021 | Sato et al. |
| 11,112,712 | B2 | 9/2021 | Matsunaga et al. |
| 11,169,460 | B2 | 11/2021 | Kototani et al. |
| 2001/0018158 | A1 | 8/2001 | Yoshida et al. |
| 2015/0248072 | A1 | 9/2015 | Katsuta et al. |
| 2021/0003932 | A1 | 1/2021 | Tsuda et al. |
| 2021/0003934 | A1 | 1/2021 | Fumita et al. |

FOREIGN PATENT DOCUMENTS

| | | | | | |
|---|---|---|---|---|---|
| JP | 2017-138462 | A | | 8/2017 | |
| JP | 2018194837 | A | * | 12/2018 | ............... G03G 9/08 |

OTHER PUBLICATIONS

U.S. Appl. No. 17/348,053, filed Jun. 15, 2021, Taiji Katsura.
U.S. Appl. No. 17/496,859, filed Oct. 8, 2021, Sara Yoshida.

* cited by examiner

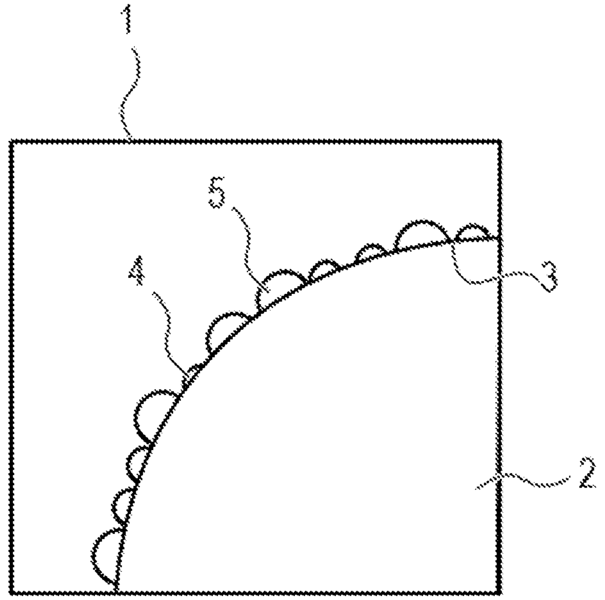
*FIG. 2*
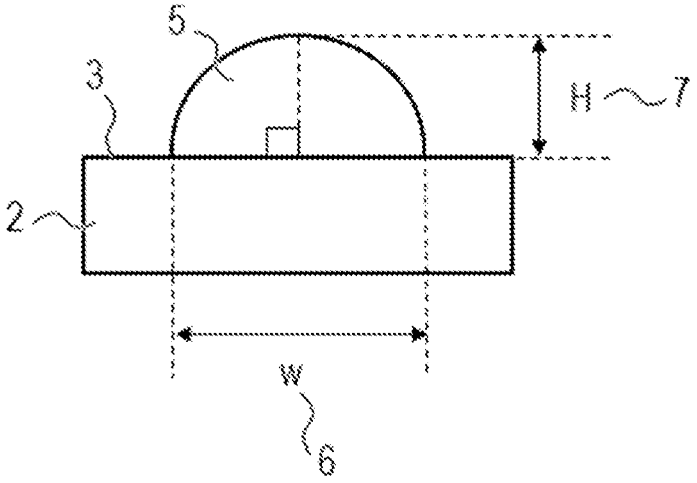

TONER

BACKGROUND OF THE INVENTION

Field of the Invention

The present invention relates to a toner that is used in an image forming method such as electrophotography.

Description of the Related Art

An electrophotographic image forming apparatus is required to have a high image quality, a long service life, a small size and the like, and in order to cope with these requirements, toner is also required to have various improved performances.

From the viewpoint of reducing the size of the electrophotographic image forming apparatus, attempts have been made to reduce sizes of various units that constitute the electrophotographic image forming apparatus. In particular, if the transferability of the toner is improved, a waste toner vessel for collecting the transfer residual toner on the photosensitive drum can be downsized, and accordingly, various attempts have been made to improve the transferability of the toner.

In a transfer process, the toner that has been developed on the photosensitive drum is transferred to a medium such as paper. In order to improve the transferability of the toner, it is important to lower an adhesive force between the photosensitive drum and the toner, so as to facilitate the toner to become detached from the photosensitive drum. Examples of measures for lowering the adhesive force between the photosensitive drum and the toner include a method of attaching an external additive to the surface of a toner particle. In particular, a technique is known which adds a spherical external additive having a large particle size, due to a resulting spacer effect, lowers a physical adhesive force between the photosensitive drum and the toner, and improves transfer efficiency. This technique is an effective technology as a method for improving the transfer efficiency, but while images are output for a long period of time, the spherical external additive having a large particle size migrates from, is detached from, or becomes embedded in the surface of the toner particle, and becomes unable to function as the spacer. It has been thus difficult for this technique to stably obtain an expected effect of improving the transfer efficiency.

For this reason, Japanese Patent Application Laid-Open No. 2009-36980 proposes a technique of semi-embedding the external additive having the large particle size onto the surface of the toner particle and suppressing the migration and/or detachment of the external additive having the large particle size. This technique can suppress the migration and/or detachment of the external additive having the large particle size from the surface of the toner particle, but has a problem that the embedding results in being accelerated.

On the other hand, Japanese Patent No. 5223382 proposes a technique of using a hemispherical external additive having a large particle size, and thereby suppressing the detachment and/or embedding of the external additive having the large particle size in the surface of the toner particle. However, it is difficult for this technique to fix the external additive having the large particle size onto a uniform surface of the toner particle, and accordingly, it has been difficult to maintain such an effect of improving the transfer efficiency as to correspond to the further long life.

For this reason, Japanese Patent Application Laid-Open No. 2017-138462 proposes a technique of using the external additive having the large particle size and a silane coupling agent in combination. This technique has enabled the external additive having the large particle size to be fixed on the surface of the toner particle due to the silane coupling agent, and also to control the roughness of the surface of the toner particle. As a result, the technique has enabled the external additive having the large particle size to suppress the migration and/or detachment from, or embedment in the surface of the toner particle, and to develop high transferability for a long period of time.

As a further technology, such a technology is considered as to maintain excellent transferability even when the transfer bias is lowered. Then the technology can reduce the size of the power supply unit, which can lead to a further reduction in the size of the electrophotographic image forming apparatus. For this reason, a toner has been demanded that can maintain satisfactory transferability even when the transfer bias is low.

SUMMARY OF THE INVENTION

An object of the present invention is to provide a toner that solves the above problems.

Specifically, the object of the present invention is to provide a toner that can maintain the excellent transferability even when the transfer bias is low throughout endurance.

The present invention relates to a toner including a toner particle that includes a toner base particle and a plurality of convex portions X existing on the surface of the toner base particle, wherein each of the convex portions X contains an organic silicon polymer; when a cross-section of the toner is observed with a scanning transmission electron microscope (STEM), the convex portions X comprise a plurality of convex portions Y each having a convex height H of 40 nm or higher and the convex portions Y comprise a plurality of convex portions Y2 each having a value of a ratio (H/w) of the convex height H to a convex width w of 0.33 or larger and 0.80 or smaller, the convex width w defining a maximum line segment in a continuous interface between the toner base particle and each of convex portions X, the convex height H defining a maximum length of each of the convex portions X in a normal direction of the convex width w, a number ratio P (H/w) of a number of a number of the convex portions Y2 is 70% by number or more with respect to a total number of the convex portions Y; and a migration rate of the convex portions X in a water washing method of the toner is 5% by number or larger and 20% by number or smaller of a total of the convex portions X before water washing, and a number average particle size D1 of the convex portions X that have migrated into water by the water washing method is 30 nm or larger and 300 nm or smaller.

According to the present invention, a toner that exhibits the high transferability even when the transfer bias is low, and resists changing and maintains the high transferability through endurance can be provided.

Further features of the present invention will become apparent from the following description of exemplary embodiments with reference to the attached drawings.

BRIEF DESCRIPTION OF THE DRAWINGS

FIG. 1 is a schematic view of one example of cross-sectional observation by STEM of a toner of the present invention.

FIG. 2 is a schematic view of one example in which a convex shape of a toner according to the present invention has been measured.

DESCRIPTION OF THE EMBODIMENTS

Preferred embodiments of the present invention will now be described in detail in accordance with the accompanying drawings.

In order to improve transfer efficiency, it is effective to lower an adhesive force between a photosensitive drum (hereinafter, also simply referred to as "drum") and toner. It is thus important to control a structure of the surface of the toner particle, and the transferability has been improved by the previously described conventional technologies. However, in recent years in which further miniaturization of the electrophotographic image forming apparatus is required, a technology is required that maintains satisfactory transferability even though a transfer bias is lowered. Then, the present inventors have studied a technology for maintaining excellent transferability even when the transfer bias has been lowered.

A relationship between the toner and the drum before transfer is in such a state that the toner is electrically and physically attached to the drum. The transfer bias is applied to the toner in this state, and thereby, the toner is electrically attracted toward a transfer medium to be transferred onto the medium. Accordingly, if the transfer bias is low, the toner cannot move due to a strong attractive force between the toner and the photosensitive member, and the transfer residual toner results in increasing. Many conventional technologies such as an external additive having a large particle size have focused on the reduction of a physical adhesive force, but have had difficulty in the reduction of an electrical adhesive force as well. The reason for this is that the electrical adhesive force is generated because the toner is charged, and accordingly that in order to develop the toner on the drum in a pre-transfer process, it is indispensable to charge the toner. In addition, it has also been difficult in the conventional technology to conveniently attenuate the charge after the toner has passed through the development process. Accordingly, it has been considered that if a technology could be created in which a high charge amount is maintained when the toner is developed on the drum and the charge is attenuated after the toner has been developed on the drum, transfer by a low transfer bias can be achieved, which has conventionally resisted being achieved.

The present inventors have studied technologies for attenuating the charge of the toner on the drum while paying attention to the electrification rank of various substances. As a result, it has been found that when the toner is transferred in a state in which particles having a higher charge amount than that of the toner exist on the drum, the toner can maintain satisfactory transferability even if the transfer bias has been lowered. In particular, it has been particularly effective to transfer the toner in a state in which particles of an organic silicon polymer having a specific particle size have existed on the drum.

This mechanism is considered to be as follows. The organic silicon polymer has an electrification rank as high as that of Teflon (registered trademark), and has a property of being easily charged to a negative side. When the organic silicon polymer is added to the developer separately from the toner so as to be rubbed against the toner, an electrostatic property of the toner tends to decrease, because the particle of the organic silicon polymer tends to be negatively charged. It is considered that the lowering of the electrostatic property which the toner originally owns has lowered the electrical adhesive force between the toner and the drum, and the toner has been able to maintain satisfactory transferability even when the charging bias has been lowered.

Here, measures for causing the organic silicon polymer to exist on the drum are necessary. As the measures, it has been considered to cause the organic silicon polymer that tends to easily migrate to the drum to exist on the surface of the toner base particle, and to migrate to the drum at the time of development. It has been considered that by doing so, the organic silicon polymer can contribute to both of excellent charging characteristics and transfer characteristics. Specifically, the organic silicon polymer has a negatively charging property higher than that of Teflon (registered trademark), and accordingly, can contribute to satisfactory charging characteristics of the toner, if having existed on the surfaces of the toner base particles at the time of development. Then, after the image has been developed on the drum, the organic silicon polymer is moved to the drum side, and thereby, the organic silicon polymer can contribute to the satisfactory transfer characteristics of the toner. In other words, it has been considered that if the organic silicon polymer that tends to easily migrate to the drum exists on the surfaces of the toner base particles, the organic silicon polymer can achieve both of the effects. Conventionally, a technology from the viewpoint of how to prevent the external additive or the like existing on the surfaces of the toner base particles from being removed from the toner has been main, and accordingly, such a study has not been performed as to intentionally and positively move a material, the external additive or the like on the surfaces of the toner base particles to the drum.

A toner of the present invention is a toner having a toner particle that has a toner base particle and a plurality of convex portions X existing on the surface of the toner base particle, wherein each of the convex portions X contains an organic silicon polymer. With this toner, satisfactory charging characteristics and an effect of an improvement of transferability based on an improvement of fluidity can be obtained.

Furthermore, the toner particle of the present invention has a plurality of convex portions X containing an organic silicon polymer, which exist on the surface of toner base particle, wherein when a cross-section of the toner is observed with STEM, the convex portions X comprise a plurality of convex portions Y each having a convex height H of 40 nm or higher and the convex portions Y comprise a plurality of convex portions Y2 each having a value of a ratio (H/w) of the convex height H to a convex width w of 0.33 or larger and 0.80 or smaller, the convex width w defining a maximum line segment in a continuous interface between the toner base particle and each of convex portions X, the convex height H defining a maximum length of each of the convex portions X in a normal direction of the convex width w, a number ratio P (H/w) of a number of the convex portions Y2 is 70% by number or more with respect to the whole of the convex portions Y.

This configuration is considered to produce such an effect that a spacer effect occurs between the surface of the toner base particle and the drum due to the convex portions X, thereby the adhesive force between the toner and the drum is lowered, and the transferability can be improved. On the other hand, when the convex height H becomes high, a force tends to be easily applied to the surface of the toner particle, but the convex portions X of the present invention is characterized in that the convex portions X comes in surface contact with the surface of the toner base particle, and due to the surface contact, such an effect can be remarkably expected as to suppress the embedding of the organic silicon polymer of the convex portions X into the toner base particle. In order to express a degree of the surface contact, a cross section of the toner was observed by STEM. FIG. 1 illustrates an STEM image. Reference numeral 1 denotes an STEM image which draws about ¼ of the toner particle, reference numeral 2 denotes a toner base particle, reference numeral 3 denotes a surface of the toner base particle, reference numeral 4 denotes a convex portion X, and reference numeral 5 denotes a convex portion Y. FIG. 2 illustrates one example of the convex portion X on the surface of the toner particle. Reference numeral 6 denotes a convex width w, and reference numeral 7 denotes a convex height H. It has been found that if the convex portions X have convex shapes each having a value (H/w) of a ratio of the convex height H to the convex width w of 0.33 or larger and 0.80 or smaller, the embedding of the organic silicon polymer being suppressed. Specifically, it has been found that if each of the convex portions of the organosilicon compound has a convex shape as illustrated in FIG. 2, the embedding of the organic silicon polymer being suppressed. In addition, it has been found that it is a requisite for the toner of the present invention to exhibit the excellent transferability which can withstand the life extension that in the convex portions Y in which the convex height H is 40 nm or higher, a number ratio P (H/w) of a number of the convex portions Y2 that have values of a ratio (H/w) of the convex height H to the convex width w of 0.33 or larger and 0.80 or smaller is 70% by number or more with respect to the whole of the convex portions Y.

Furthermore, it is necessary in the toner of the present invention that a migration rate of the convex portions X in a water washing method of the toner is 5% by number or more and 20% by number or less of the total of the convex portions X before water washing. Furthermore, it is necessary that the number average particle size D1 of the convex portions X which have migrated into water by the water washing method is 30 nm or larger and 300 nm or smaller. When the migration rate is 5% by number or more, the organic silicon polymer existing on the surface of the toner base particle migrates to the drum side, and thereby the toner can maintain the excellent transferability even when the transfer bias is lowered. On the other hand, when the ratio is 20% by number or less, a necessary number of particles of the organic silicon polymer can be supplied to the drum side during the endurance, and accordingly, the toner can maintain the excellent transferability throughout the endurance. When the number average particle size D1 of the convex portions X is 30 nm or larger, the convex portions X can be triboelectrically charged independently from the toner, and accordingly, the electrostatic property of the toner can be lowered; and the toner can maintain the excellent transferability even when the transfer bias is lowered. On the other hand, if the particle size is too large, the fluidity becomes lowered, and accordingly, it is preferable for the excellent transferability that the particle size is 300 nm or smaller.

In a more preferable case, it is preferable that the number average particle size D1 is 50 nm or larger and 300 nm or smaller, and a ratio D1/D2 of D1 to the number average particle size D2, which is the number average particle size of the convex portions X that migrate into water, when the toner which has been subjected to the water washing method is washed again with water, is 1.0 or larger and 5.0 or smaller. When the number average particle size D1 is this particle size, the spacer becomes provided on both of the drum and the toner, and accordingly particularly excellent transferability is obtained. In addition, the content that the D1/D2 is 1.0 or larger and 5.0 or smaller means that a particle of the organic silicon polymer having a larger particle size moves to the drum side. When the particle size of the organic silicon polymer that moves to the drum side is small, the particle results in being embedded between the convex portions X of the toner particle, and is not sufficiently rubbed against the toner, in some cases. When D1/D2 is 1.0 or larger, the toner and the particle of the organic silicon polymer can be sufficiently rubbed against each other, which is accordingly preferable. On the other hand, if the D1/D2 is too large, the fluidity becomes lowered, and accordingly, it is preferable for the excellent transferability that the D1/D2 is 5.0 or smaller.

For the toner of the present invention, an organic silicon polymer is preferably used that has a structure represented by the following formula (1).

$$R\text{—}SiO_{3/2} \quad (1),$$

wherein R represents an alkyl group having 1 or more and 6 or less carbon atoms or a phenyl group.

In the organic silicon polymer having the structure of the formula (1), one of the four valences of the silicon atom is bonded to the R, and the remaining three valences are bonded to the O atom. The O atom forms a state in which both of two valences are bonded to Si, that is, a siloxane bond (Si—O—Si). Considering the Si atom and the O atom as the organic silicon polymer, two Si atoms have three O atoms, and accordingly the Si atom and the O atom are expressed as $—SiO_{3/2}$. It is considered that $—SiO_{3/2}$ structure of the organic silicon polymer has properties similar to those of silica ($SiO_2$) that is constituted by a large number of siloxane bonds.

In a partial structure represented by the formula (1), it is preferable for R to be an alkyl group having 1 or more and 6 or less carbon atoms, and is more preferably to be an alkyl group having 1 or more and 3 or less carbon atoms.

As the alkyl group having 1 or more and 3 or less carbon atoms, a methyl group, an ethyl group and a propyl group can be preferably exemplified. More preferably, R is the methyl group.

It is preferable that the organic silicon polymer is a polycondensate of an organosilicon compound having a structure represented by the following formula (Z).

(Z)

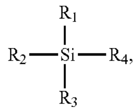

wherein $R_1$ represents a hydrocarbon group (preferably an alkyl group) having 1 or more and 6 or less carbon atoms, and $R_2$, $R_3$ and $R_4$ each independently represent a halogen atom, a hydroxy group, an acetoxy group or an alkoxy group.

It is preferable for $R_1$ to be an aliphatic hydrocarbon group having 1 or more and 3 or less carbon atoms, and is more preferable to be a methyl group.

$R_2$, $R_3$ and $R_4$ are each independently a halogen atom, a hydroxy group, an acetoxy group or an alkoxy group (hereinafter also referred to as a reactive group). These reactive groups undergo hydrolysis, addition polymerization and condensation polymerization to form a crosslinked structure.

It is preferable for the reactive group to be an alkoxy group having 1 or more and 3 or less carbon atoms, and is more preferable to be a methoxy group or an ethoxy group, from the viewpoint of having a moderate hydrolyzation property at room temperature and a precipitation property onto the surface of the toner base particle.

In addition, the hydrolysis, addition polymerization and condensation polymerization of $R_2$, $R_3$ and $R_4$ can be controlled by a reaction temperature, a reaction time period, a reaction solvent and pH. In order to obtain the organic silicon polymer that is used in the present invention, it is acceptable to use one type or a combination of a plurality of types of organosilicon compounds having three reactive groups ($R_2$, $R_3$ and $R_4$) in one molecular (hereinafter, also referred to as trifunctional silanes), which exclude $R_1$ in the formula (Z) shown above.

Examples of the chemical compound represented by the formula (Z) include the following compounds:

trifunctional methyl silanes such as methyl trimethoxy silane, methyl triethoxy silane, methyl diethoxymethoxy silane, methyl ethoxydimethoxy silane, methyl trichlorosilane, methyl methoxy dichlorosilane, methyl ethoxy dichlorosilane, methyl dimethoxy chlorosilane, methyl methoxyethoxy chlorosilane, methyl diethoxy chlorosilane, methyl triacetoxy silane, methyl diacetoxymethoxy silane, methyl diacetoxyethoxy silane, methyl acetoxydimethoxy silane, methyl acetoxymethoxyethoxy silane, methyl acetoxydiethoxy silane, methyl trihydroxy silane, methyl methoxydihydroxy silane, methyl ethoxydihydroxy silane, methyl dimethoxyhydroxy silane, methyl ethoxymethoxyhydroxy silane and methyl diethoxyhydroxy silane;

trifunctional silanes such as ethyl trimethoxy silane, ethyl triethoxy silane, ethyl trichlorosilane, ethyl triacetoxy silane, ethyl trihydroxy silane, propyl trimethoxy silane, propyl triethoxy silane, propyl trichlorosilane, propyl triacetoxy silane, propyl trihydroxy silane, butyl trimethoxy silane, butyl triethoxy silane, butyl trichlorosilane, butyl triacetoxy silane, butyl trihydroxy silane, hexyl trimethoxy silane, hexyl triethoxy silane, hexyl trichloro silane, hexyl triacetoxy silane and hexyl trihydroxy silane; and trifunctional phenyl silanes such as phenyl trimethoxy silane, phenyl triethoxy silane, phenyl trichlorosilane, phenyl triacetoxy silane and phenyl trihydroxy silane.

In addition, it is acceptable to use an organic silicon polymer that has been obtained with the use of the following chemical compound, in combination with the organosilicon compound having a structure represented by the formula (Z), in an extent that the effects of the present invention are not impaired. Organosilicon compounds having four reactive groups in one molecule (tetrafunctional silanes), organosilicon compounds having two reactive groups in one molecule (difunctional silanes), or organosilicon compounds having one reactive group (monofunctional silanes). Examples thereof include the following chemical compounds:

trifunctional vinyl silanes such as dimethyl diethoxy silane, tetraethoxy silane, hexamethyl disilazane, 3-aminopropyl trimethoxy silane, 3-aminopropyl trimethoxy silane, 3-(2-aminoethyl)aminopropyl trimethoxy silane, 3-(2-aminoethyl)aminopropyl triethoxy silane, vinyl triisocyanate silane, vinyl trimethoxy silane, vinyl triethoxy silane, vinyl diethoxymethoxy silane, vinyl ethoxydimethoxy silane, vinyl ethoxydihydroxy silane, vinyl dimethoxyhydroxy silane, vinyl ethoxymethoxyhydroxy silane and vinyl diethoxyhydroxy silane.

Furthermore, it is preferable that the content of the organic silicon polymer in the toner particle is 1.0% by mass or more and 10.0% by mass or less.

As a preferable technique of forming a shape of the convex portions that contain the specific organic silicon polymer according to the present invention (hereinafter, also simply referred to as a "convex shape") on the surface of the toner base particle, it is preferable to disperse the toner base particles in an aqueous medium to obtain a dispersion liquid of the toner base particles, add an organosilicon compound thereto to form the convex shape thereon, and obtain a dispersion liquid of toner particles.

It is preferable to adjust a solid concentration in the dispersion liquid of the toner base particles to 25% by mass or more and 50% by mass or less. In addition, it is preferable to adjust a temperature of the dispersion liquid of the toner base particles to 35° C. or higher beforehand. In addition, it is preferable to adjust a pH of the dispersion liquid of the toner base particles to a pH at which condensation of the organosilicon compound resists proceeding. The pH at which the condensation of the organosilicon compound resists proceeding varies depending on the substance, and accordingly it is preferable to adjust the pH within ±0.5, centering on the pH at which the reaction is least likely to proceed.

On the other hand, it is preferable to use an organosilicon compound that has been subjected to hydrolysis treatment. Examples of the method include subjecting the organosilicon compound to hydrolysis in a separate container as a pretreatment. It is preferable for the feed concentration in the hydrolysis to be 40 parts by mass or more and 500 parts by mass or less, more preferable to be 100 parts by mass or more and 400 parts by mass or less of water from which an ion component has been removed, such as ion exchanged water or RO water, when the amount of the organosilicon compound is assumed to be 100 parts by mass of water. The conditions for the hydrolysis are preferably a pH of 2.0 or higher and 7.0 or lower, a temperature of 15° C. or higher and 80° C. or lower, and a time period of 30 minutes or longer and 600 minutes or shorter.

The obtained hydrolysis liquid of the organosilicon compound and the dispersion liquid of the toner base particles are mixed, and a pH of the resultant liquid is adjusted to a pH suitable for the condensation (preferably 6.0 or higher and 12.0 or lower, or 1.0 or higher and 3.0 or lower, and more preferably 8.0 or higher and 12.0 or lower). The amount of the hydrolysis liquid of the organosilicon compound is adjusted so that the amount of the organosilicon compound is 3.0 parts by mass or more and 30.0 parts by mass or less with respect to 100 parts by mass of the toner base particle, and thereby the convex shape becomes easily formed. In the formation of the convex shape, it is preferable to perform the condensation at a temperature of 35° C. or higher for a time period of 60 minutes or longer.

In addition, from the viewpoint of controlling the convex shape of the surface of the toner particle, it is preferable to adjust the pH in two stages. The convex shape on the surface of the toner particle can be controlled by appropriately adjusting a holding time period before the pH of the first stage is adjusted and a holding time period before the pH of the second stage is adjusted, and condensing the organosilicon compound. In addition, the convex shape can be controlled also by adjusting a condensation temperature of the organic compound in a range of 35° C. or higher and 80° C. or lower, and by adjusting the pH value.

In addition, as one example for forming the particle of the organic silicon polymer, which tends to easily migrate to the drum side, on the surface of the toner base particle, there is a method of forming the convex shape, then further raising the pH, and then adding the organosilicon compound. Thereby, a more preferable convex shape can be formed. It is preferable to adjust the pH to 10.5 or higher. When the organosilicon compound is added to the dispersion liquid of the toner base particles at this pH, the hydrolysis and the condensation proceed at once, and at the same time, the organic silicon polymer attaches to the surfaces of the toner base particles. The organic silicon polymer which has attached to the surface of the toner base particle in this way has a relatively small adhesive force to the toner base particle, and accordingly tends to easily migrate to the drum.

In addition, it is preferable that the number of the convex portions X which are observed by cross-sectional observation of the toner by STEM is 10 or more per one particle of the toner particles. When the number of the convex portions X is large, the spacer effect and/or the effect of reducing the electrical adhesive force can be sufficiently obtained, and accordingly, the transferability at a low transfer bias becomes further satisfactory. Examples of a method of controlling the number of the convex portions X include controlling an amount of the organosilicon compound to be fed at the time of production, or the pH of the dispersion liquid of the toner base particles. It is preferable that the number of the convex portions X is 300 or less, from the viewpoint of fixability.

Furthermore, it is preferable that an aspect ratio of the convex portions X which have migrated into water by the water washing method in a flow type image analysis method is 0.3 or larger and 0.8 or smaller, and an average circularity of the convex portions X which have migrated into water by the water washing method is 0.70 or larger and 0.90 or smaller in a flow type image analysis method. When the aspect ratio is 0.8 or smaller, rolling on the drum is suppressed, accordingly, the toner and the convex portions X can be efficiently rubbed against each other, and the transferability becomes further satisfactory. On the other hand, when the ratio is 0.3 or larger, the fluidity is kept, and accordingly, the transferability becomes further satisfactory. When the average circularity is 0.90 or smaller, rolling on the drum is suppressed, accordingly the toner and the convex portions X can be efficiently rubbed against each other, and the transferability becomes further satisfactory. On the other hand, when the average circularity is 0.70 or larger, the fluidity is kept, and accordingly the transferability becomes further satisfactory. Examples of a method of controlling the aspect ratio and the average circularity include controlling the pH, the temperature, the time period and the stirring number of the dispersion liquid of the toner particles at the time of production.

Specific methods for producing the toner of the present invention will be described below, but the present invention is not limited to these methods.

The toner base particle can be produced with the use of known measures, such as a kneading pulverization method and a wet production method. From the viewpoint of uniformalization of the sizes of the particles and shape controllability, the wet production method can be preferably used. Furthermore, examples of the wet production method include a suspension polymerization method, a dissolution suspension method, an emulsion polymerization aggregation method and an emulsion aggregation method. In the present invention, the suspension polymerization method can be preferably used. In the suspension polymerization method, the organic silicon polymer tends to easily precipitate uniformly on the surfaces of the toner base particles, and adhesiveness between the organic silicon polymer and the toner base particle of the toner particle is excellent. The toner obtained from this toner particle becomes satisfactory in environmental stability, an effect of suppressing a component which reverses the charge amount, and endurance sustainability of the performances. The suspension polymerization method will be further described below.

The suspension polymerization method is a method of obtaining the toner base particle by granulating a polymerizable monomer composition that contains a polymerizable monomer capable of forming a binder resin and optionally an additive such as a colorant, in an aqueous medium, and polymerizing the polymerizable monomer that is contained in the polymerizable monomer composition.

A release agent and another resin may be added to the polymerizable monomer composition, as needed. After the polymerization process has been completed, the produced particles are washed, collected by filtration and dried, and the toner base particles are obtained. For information, the temperature may be raised in the latter half of the polymerization process. Furthermore, in order to remove unreacted polymerizable monomers or by-products, a part of the dispersion medium may be distilled off from the reaction system, in the latter half of the polymerization process or after the polymerization process has been completed. Examples of the release agent include the following compounds: paraffin wax, microcrystalline wax, petroleum waxes such as petrolatum and derivatives thereof, montan wax and derivatives thereof, hydrocarbon waxes by Fischer-Tropsch process, and derivatives thereof, polyolefin waxes such as polyethylene and polypropylene, and derivatives thereof, natural waxes such as carnauba wax and candelilla wax, and derivatives thereof, higher aliphatic alcohols, fatty acids such as stearic acid or palmitic acid, or chemical compounds thereof, acid amide waxes, ester waxes, ketones, hydrogenated castor oil and derivatives thereof, vegetable waxes, animal waxes and silicone resins. Note that the derivatives include oxides, block copolymers with vinyl-based monomers, and graft-modified products. The derivatives may be used alone or in combination.

The following resins can be used as the above other resins, in such a range as not to give an influence on the effect of the present invention. Homopolymers of styrene and a substitution product thereof such as polystyrene and polyvinyltoluene; styrene-based copolymers such as a styrene-propylene copolymer, a styrene-vinyltoluene copolymer, a styrene-vinylnaphthalene copolymer, a styrene-methyl acrylate copolymer, a styrene-ethyl acrylate copolymer, a styrene-butyl acrylate copolymer, a styrene-octyl acrylate copolymer, a styrene-dimethylaminoethyl acrylate copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-maleic acid copolymer and a styrene-maleate copolymer; and polymethyl methacrylate, polybutyl methacrylate, polyvinyl acetate, polyethylene, polypropylene, polyvinyl butyral, silicone resins, polyester resins, polyamide resins, epoxy resins, polyacrylic resins, rosin, modified rosin, terpene resins, phenol resins, aliphatic or alicyclic hydrocarbon resins, and aromatic petroleum resins. These resins can be used alone or in combination.

Preferable examples of the polymerizable monomer in the suspension polymerization method include vinyl-based polymerizable monomers shown in the following: styrene; styrene derivatives such as α-methylstyrene, β-methylstyrene, o-methylstyrene m-methyl styrene, p-methyl styrene, 2,4-dimethyl styrene, p-n-butylstyrene, p-tert-butylstyrene, p-n-hexylstyrene, p-n-octylstyrene, p-n-nonylstyrene, p-n-decylstyrene, p-n-dodecyl styrene, p-methoxystyrene, and p-phenyl styrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate and 2-benzoyloxy ethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate and dibutyl phosphate ethyl methacrylate; methylene aliphatic monocarboxylates; vinyl esters such as vinyl acetate, vinyl propionate, vinyl benzoate, vinyl butyrate, and vinyl formate; vinyl ethers such as vinyl methyl ether, vinyl ethyl ether and vinyl isobutyl ether; and vinyl methyl ketone, vinyl hexyl ketone and vinyl isopropyl ketone.

Among these vinyl polymers, styrene polymers, styrene-acrylic copolymers, and styrene-methacrylic copolymers are preferable.

In addition, a polymerization initiator may be added at the time of the polymerization of the polymerizable monomer. Examples of the polymerization initiator include the following compounds: azo-based or diazo-based polymerization initiators such as 2,2'-azobis-(2,4-divaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile; and peroxide-based polymerization initiators such as benzoyl peroxide, methyl ethyl ketone peroxide, diisopropyloxy carbonate, cumene hydroperoxide, 2, 4-dichlorobenzoyl peroxide and lauroyl peroxide. These polymerization initiators are preferably added in an amount of 0.5% by mass or more and 30.0% by mass or less with respect to 100 parts by mass of the polymerizable monomer and may be used alone or in combination.

In addition, in order to control a molecular weight of the binder resin that constitutes the toner base particle, a chain transfer agent may be added at the time of the polymerization of the polymerizable monomer. A preferable amount to be added is 0.001% by mass or more and 15.000% by mass or less, with respect to 100 parts by weight of the polymerizable monomer.

On the other hand, in order to control the molecular weight of the binder resin that constitutes the toner base particle, a cross-linkable monomer may be added as a crosslinking agent, at the time of the polymerization of the polymerizable monomer. Examples of the cross-linkable monomer include the following compounds: divinylbenzene, bis(4-acryloxypolyethoxyphenyl)propane, ethylene glycol diacrylate, 1, 3-butylene glycol diacrylate, 1, 4-butanediol diacrylate, 1, 5-pentanediol diacrylate, 1, 6-hexanediol diacrylate, neopentyl glycol diacrylate; diethylene glycol diacrylate, triethylene glycol diacrylate and tetraethylene glycol diacrylate; respective diacrylates of polyethylene glycols #200, #400 and #600; dipropylene glycol diacrylate, polypropylene glycol diacrylate, and polyester type diacrylate (MANDA, Nippon Kayaku Co., Ltd.); and methacrylates converted from the above acrylates.

Examples of the polyfunctional cross-linkable monomer include the following compounds: pentaerythritol triacrylate, trimethylolethane triacrylate, trimethylolpropane triacrylate, tetramethylolmethane tetraacrylate, oligoester acrylate and methacrylate thereof, 2, 2-bis(4-methacryloxy-polyethoxyphenyl) propane, diacrylate phthalate, triallyl cyanurate, triallyl isocyanurate, triallyl trimellitate and diaryl chlorendate. A preferable amount to be added is 0.001% by mass or more and 15.000% by mass or less with respect to 100 parts by mass of the polymerizable monomer.

When a medium to be used in the suspension polymerization is an aqueous medium, as a dispersion stabilizer for the particles of the polymerizable monomer composition, the following compounds can be used: tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. In addition, examples of the organic dispersing agent include the following compounds: polyvinyl alcohol, gelatin, methyl cellulose, methylhydroxypropyl cellulose, ethyl cellulose, a sodium salt of carboxymethyl cellulose, and starch.

In addition, commercially available nonionic, anionic or cationic surface active agent can be used. Examples of such surface active agents include the following compounds: sodium dodecyl sulfate, sodium tetradecyl sulfate, sodium pentadecyl sulfate, sodium octyl sulfate, sodium oleate, sodium laurate and potassium stearate.

A colorant to be used in the toner of the present invention is not particularly limited and known colorants can be used.

For information, it is preferable that a content of the colorant is 3.0 parts by mass or more and 15.0 parts by mass or less with respect to 100 parts by mass of the binder resin or the polymerizable monomer.

For the toner of the present invention, a charge control agent can be used when the toner is produced and known charge control agents can be used. It is preferable that an amount of the charge control agent to be added is 0.01 parts by mass or more and 10.00 parts by mass or less with respect to 100 parts by mass of the binder resin or the polymerizable monomer.

In the toner of the present invention, various organic or inorganic fine powders may be externally added to the toner particle, as needed. It is preferable that a particle size of the organic or inorganic fine powder is 1/10 or less of the weight-average particle size of the toner particle, from the viewpoint of endurance at the time when the fine powder has been added to the toner particle.

As the organic or inorganic fine powder, for example, the following chemical compounds are used.

(1) Fluidity imparting agents: silica, alumina, titanium oxide, carbon black and carbon fluoride.

(2) Abrasives: metal oxides (for example, strontium titanate, cerium oxide, alumina, magnesium oxide, and chromium oxide), nitrides (for example, silicon nitride), carbides (for example, silicon carbide), and metal salts (for example, calcium sulfate, barium sulfate and calcium carbonate).

(3) Lubricants: powder of fluorine-based resin (for example, vinylidene fluoride, polytetrafluoroethylene), metal salts of fatty acids (for example, zinc stearate and calcium stearate).

(4) Charge-controllable particles: metallic oxides (for example, tin oxide, titanium oxide, zinc oxide, silica, alumina), and carbon black.

The surfaces of the organic or inorganic fine powder can also be treated in order to improve the fluidity of the toner and uniformize the electric charge of the toner. Examples of the treatment agent for hydrophobic treatment of the organic or inorganic fine powder include unmodified silicone varnishes, various modified silicone varnishes, unmodified silicone oils, various modified silicone oils, silane compounds, silane coupling agents, other organosilicon compounds, and organotitanium compounds. These treatment agents may be used alone or in combination.

Various measuring methods relating to the present invention will be described below.

Method for Observing Cross Section of Toner in Scanning Transmission Electron Microscope (STEM)

A cross section of a toner which is observed by a scanning transmission electron microscope (STEM) is prepared in the following way.

A procedure for producing the cross section of the toner will be described below.

Firstly, the toner is sprayed on a cover glass (square cover glass; square No. 1, manufactured by Matsunami Glass Ind., Ltd.) so as to form a single layer, and an Os film (5 nm) and a naphthalene film (20 nm) are applied onto the toner as protective films, with the use of an osmium plasma coater (OPC80T, Filgen Inc.).

Next, a PTFE tube (Φ1.5 mm×Φ3 mm×3 mm) is filled with a photo-curable resin D800 (produced by JEOL Ltd.), and the cover glass is gently placed on the tube so that the toner comes in contact with the photo-curable resin D800. In this state, the resin is irradiated with light to be cured, then the cover glass and the tube are removed, and a columnar resin is formed which has the toner embedded in the outermost surface.

The columnar resin is cut from the outermost surface by the length of a radius of the toner (for example, 4.0 μm when the weight-average particle size (D4) is 8.0 μm), at a cutting speed of 0.6 mm/s with the use of an ultrasonic ultramicrotome (UC7, by Leica Microsystems), and a cross section of the central portion of the toner is exposed.

Next, the cut resin is cut so that the film thickness becomes 100 nm, and a thin sample of a cross section of the toner is prepared. By such a cutting technique, a cross section of the central portion of the toner can be obtained.

By an STEM having a probe size of 1 nm, an image having a size of 1024×1024 pixels was acquired. In addition, after Contrast and Brightness in Detector Control Panel for the bright field image have been adjusted to 1425 and 3750, respectively, and Contrast, Brightness and Gamma in the Image Control Panel have been adjusted to 0.0, 0.5 and 1.00, respectively, the image was acquired.

The image magnification is 100,000 times, and the image is acquired so that about ¼ to ½ of the circumference in the cross section of one particle of the toner is contained in the image as illustrated in FIG. 1.

The obtained image is subjected to image analysis with the use of image processing software (Image J (available from https://imagej.nih.gov/ij/)), and the convex portion containing the organic silicon polymer is measured. STEM images at 30 points are subjected to the image analysis.

Firstly, a line along the circumference of the toner base particle is drawn with a line drawing tool (where the segmented line of the Straght tab is selected). In a portion in which the convex portion of the organic silicon polymer is embedded in the toner base particle, the line is smoothly connected on the assumption that the convex portion is not embedded. The obtained image is converted to a horizontal image based on the line (Selection of Edit tab is selected, line width is changed to 500 pixels by properties, then Selection of Edit tab is selected, and Straghtener is performed).

ROI Manager is selected from Tools in the Analyze menu and Show All and Labels in a newly opened ROI Manager window are checked beforehand. Subsequently, with the use of a straight line tool (Straight Line) in the tool bar, as illustrated in FIG. 2, a straight line is obtained which has been converted from the line along the circumference of the toner base particle of the convex portion. A straight line is drawn that is perpendicular to the converted straight line and forms a maximum height H which intersects with a curve of the convex portion. In this state, Add of the ROI Manager window is selected. Next, a straight line is drawn that has a maximum width w perpendicular to the H; Add is selected; and then Measure of the ROI Manager window is selected. Then, analysis is carried out. From a newly opened Results window, lengths corresponding to H and w are acquired, and H/w is calculated.

By this calculation, the number of the convex portions Y2 is counted in which P(H/w) is 0.33 or larger and 0.80 or smaller among the convex portions Y in which the convex height H is 40 nm or higher, and a number ratio of the former convex portions Y2 with respect to the whole (total number) of the convex portions Y in 30 points of the STEM images is calculated.

When the number of the convex portions X is determined that are observed by the cross-sectional observation, an image is acquired so that one particle of the toner is contained in an image at a magnification of 50000 times, and the number of the convex portions X in the obtained image is counted. The number of the convex portions X is counted on 30 particles of the toner, and an averaged value is determined to be the number of the convex portions X.

Scanning Electron Microscope (SEM) Observation Method

A method of SEM observation is as follows. An image is observed which is photographed with a Hitachi ultrahigh resolution field emission scanning electron microscope S-4800 (Hitachi High-Technologies Corporation). The image photographing conditions of S-4800 are as follows.

(1) Sample Preparation

An electroconductive paste (TED PELLA, Inc, Product No. 16053, PELCO Colloidal Graphite, Isopropanol base) is thinly applied to a sample stage (aluminum sample stage 15 mm×6 mm), and the toner is sprayed thereon. Furthermore, air is blown to remove excess fine particles from the sample stage, and platinum is vapor-deposited at 15 mA for 15 seconds. The sample stage is set on a sample holder, and the height of the sample stage is adjusted to 30 mm with a sample height gauge.

(2) Setting of S-4800 Observation Condition

Liquid nitrogen is injected into an anti-contamination trap that is attached to a housing of S-4800 until the liquid nitrogen overflows, and the anti-contamination trap is left for 30 minutes. The "PC-SEM" in S-4800 is started, and flushing (cleaning of FE chip which is electron source) is performed. An acceleration voltage display portion on the control panel on the screen is clicked, the [Flushing] button is pressed, and the flushing execution dialog is opened. It is confirmed that the flushing intensity is 2, and the flushing is executed. It is confirmed that an emission current by the flushing is 20 to 40 μA. The sample holder is inserted into a sample chamber in the S-4800 housing. The [Origin] on the control panel is pressed, and the sample holder is moved to the observation position.

The acceleration voltage display portion is clicked to open an HV setting dialog, and the acceleration voltage is set to [2.0 kV] and the emission current is set to [10 μA]. In the [Basic] tab on the operation panel, the signal selection is set to [SE], the SE detector is set to [low (L)], and a mode of observing the backscattered electron image is set. Similarly, in the [Basic] tab in the operation panel, a probe current in an electron optical system condition block is set to [Normal], a focus mode is set to [UHR], and WD is set to [8.0 mm]. An [ON] button in an acceleration voltage display portion on a control panel is pressed, and an acceleration voltage is applied.

(3) Focus Adjustment

The portion inside the magnification display portion on the control panel is dragged to set the magnification to 5000 (5 k) times. A focus knob [COARSE] on an operation panel is rotated, and aperture alignment is adjusted when focus has been achieved to some extent. [Align] on the control panel is clicked to display an alignment dialog, and [Beam] is selected. STIGMA/ALIGNMENT knobs (X, Y) on the operation panel are rotated to move the displayed beam to the center of the concentric circle.

Next, [Aperture] is selected, and the STIGMA/ALIGNMENT knobs (X, Y) are turned one by one to be adjusted so that the movement of the image stops or becomes minimal. The aperture dialog is closed, and the focus is adjusted by autofocus. This operation is further repeated twice to adjust the focus. The portion inside the magnification display portion on the control panel is dragged in a state in which a midpoint of the maximum diameter of the observed particle is matched with the center of the measurement screen, and the magnification is set to 10000 (10 k) times. A focus knob [COARSE] on an operation panel is rotated, and aperture alignment is adjusted when the focus is achieved to some extent. [Align] on the control panel is clicked to display the alignment dialog, and [Beam] is selected. The STIGMA/ALIGNMENT knobs (X, Y) on the operation panel are rotated to move the displayed beam to the center of the concentric circle.

Next, [Aperture] is selected, and the STIGMA/ALIGNMENT knobs (X, Y) are turned one by one to be adjusted so that the movement of the image stops or becomes minimal. The aperture dialog is closed, and the focus is adjusted by the autofocus. After that, the magnification is set to 50000 (50 k) times, the STIGMA/ALIGNMENT knob is used in the same manner as described above to adjust the focus, and the focus is adjusted again by the autofocus. This operation is repeated again to adjust the focus.

(4) Image Storage

Brightness is adjusted in an ABC mode, and the image is photographed into a size of 640×480 pixels and is then stored.

From the obtained SEM observation results, the number average particle size (D1) of 500 points of the convex portions of which the maximum diameters were 20 nm or larger in the observed particles that existed on the surface of the toner was calculated by image processing software (Image J). The measurement method is as follows.

Method for Measuring Migration Rate of the Convex Portions X by Water Washing Method The toners before and after water washing are observed with SEM, the number of the convex portions which has decreased after the water washing is counted from the number of the convex portions X before water washing, and the migration rate is calculated. Specifically, the method is as follows.

Sucrose (produced by Kishida Chemical Co., Ltd.) in an amount of 160 g is added to 100 mL of ion-exchanged water and is dissolved thereinto while the mixture is heated in water-bath to prepare a concentrated sucrose liquid. A dispersion liquid is prepared by an operation of charging 31 g of the above concentrated sucrose liquid and 6 mL of Contaminone N (aqueous solution of 10% by mass of neutral detergent for cleaning precision measuring instrument with pH of 7, which contains nonionic surface active agent, anionic surface active agent and organic builder, produced by Fujifilm Wako Pure Chemical Corporation) in a tube for centrifugation (50 ml of volume). Into the dispersion liquid, 1.0 g of toner is added, and lumps of the toner are loosened with a spatula or the like.

The tube for centrifugation is shaken in a shaker at 350 spm (strokes per min) for 20 minutes. After shaking, the solution is shifted to a glass tube (50 mL of volume) for a swing rotor, and the toner is separated by a centrifugal separator (H-9R, manufactured by Kokusan Co. Ltd.) under the conditions of 3500 rpm and 30 minutes. It is visually confirmed that the toner and the aqueous solution are sufficiently separated, and the toner that has been separated into the uppermost layer is collected with a spatula or the like. The aqueous solution containing the collected toner is filtered by a vacuum filter, and the residue is dried by a drier for 1 hour or longer. The dried toner is crushed with a spatula, and a sample after water washing is obtained. Each of the samples before water washing and the sample after water washing is subjected to SEM observation by the previously described method. From the observation result of the obtained SEM, the convex portions and the toner base particles in the image are binarized and color-coded by an image processing software (image J), and the number of the convex portions X existing on the toner surfaces is counted. This operation is performed a plurality of times, and an average value of 100 particles of the toner is determined; and thereby the number N of the convex portions X (the whole of convex portions X (total number) before water washing) is calculated. In the same method, the number N (after water washing) of the convex portions after water washing is calculated. After that, the migration rate can be determined according to the following Expression:

$$\text{migration rate (\% by number)}=\{N(\text{before water washing})-N(\text{after water washing})\}/N(\text{before water washing}).$$

In addition, when it is desired to obtain the migration rate in terms of % by weight, the migration rate can be obtained according to the following method. The amount of silicon in the obtained sample after water washing is measured by fluorescent X-ray. The migration rate (% by weight) is calculated from a ratio between the amounts of the elements to be measured of the toner after water washing and the toner before water washing.

Each element is measured with fluorescent X-ray according to JIS K 0119-1969, and the measurement method is specifically as follows.

Measuring devices to be used are a wavelength-dispersive X-ray fluorescence instrument "Axios" (manufactured by Malvern Panalytical Ltd.) and dedicated software "SuperQ ver. 4.0F" (produced by Malvern Panalytical Ltd.) which is attached thereto for setting measuring conditions and analyzing measured data. In addition, it is determined to be that Rh is used as an anode of the X-ray tube, the measurement atmosphere is vacuum, the measurement size (mask size of collimator) is 10 mm, and the measurement time period is 10 seconds. In addition, when light elements are measured, a proportional counter (PC) is used for the detection, and when heavy elements are measured, a scintillation counter (SC) is used for the detection.

As for the measurement sample, about 1 g of the toner after water washing and the toner before water washing are placed in a dedicated aluminum ring for pressing, which has a diameter of 10 mm, and the toners are flattened; next, the toners are pressed at 20 MPa for 60 seconds with the use of a tablet molding compressor "BRE-32" (manufactured by Maekawa Testing Machine Mfg. Co., Ltd.) to form a molded pellet having a thickness of about 2 mm; and the pellet is used.

The measurement is performed under the above conditions, the element is identified based on a peak position of the obtained X-ray, and the concentration thereof is calculated from a count rate (unit: cps) which is the number of X-ray photons per unit time.

As for a method of quantifying the elements in the toner, for example, in the case of silicon amount, for example, fine silica ($SiO_2$) powder is added so as to occupy 0.5 parts by mass with respect to 100 parts by mass of toner particles, and the mixture is thoroughly mixed with the use of a coffee mill. Similarly, the fine silica powders are mixed with the toner particles so as to be 2.0 parts by mass and 5.0 parts by mass, respectively, and these mixtures are used as samples for the calibration curve.

Each of the samples is pressed as described above with the use of the tablet molding compressor, and a pellet of a sample for the calibration curve is prepared; and a count rate (unit: cps) of Si-Kα rays is measured that are observed at a diffraction angle (2θ) of 109.08 degrees when PET is used as a spectroscopic crystal. At this time, an acceleration voltage and an electric current value of the X-ray generating apparatus are set at 24 kV and 100 mA, respectively. The obtained X-ray count rate is taken as a vertical axis, and an amount of added $SiO_2$ in each of the samples for the calibration curve is taken as a horizontal axis; and a calibration curve of a linear function is obtained.

Next, the toner to be analyzed is formed into the pellet as described above with the use of the tablet molding compressor, and the count rate of Si-Kα rays is measured. Then, the content of the organic silicon polymer in the toner is determined from the calibration curve. A ratio of the amount of the element in the toner after water washing is determined, with respect to the amount of the element in the initial toner, which has been calculated by the above method, and the ratio is defined as the migration rate (% by weight).

Method for Measuring Number Average Particle Sizes D1 and D2 of Convex Portions Having Migrated into Water The number average primary particle size is measured with the use of a dynamic light scattering particle size distribution measuring device (Nanotrac Wave II UZ152: manufactured by Microtrac BEL Corp.). As for the measurement, the particle sizes of particles are measured which are contained in an aqueous solution side when the toner and the aqueous solution are separated by a centrifugal separator in the previously described water washing procedure. The above aqueous solution is charged into a cell while the concentration is appropriately adjusted, and the measurement is performed after waiting for one minute to eliminate the influence of bubbles. The measurement was carried out under such measuring conditions that the refraction index of the sample particle was 1.59, the refraction index of the dispersion medium was 1.33, and a measurement time period was 600 seconds, according to the procedure described in the instruction manual. The particle sizes obtained for each channel are accumulated from a smaller side on the number basis, and the particle size at which the accumulation has reached 50% is defined as the number average primary particle size. This measurement is carried out three times, and the average value is determined.

Measurement of Aspect Ratio and Average Circularity by Flow-Type Image Analysis of Convex Portions X Measuring devices to be used are a flow-type particle image analyzer "FPIA-3000" (manufactured by Sysmex Corporation) and an "automatic sampler equipped with automatic sample dispersion function for FPIA-3000" (manufactured by Sysmex Corporation). Dedicated software that is attached thereto is used for setting measuring conditions and analyzing measured data.

For the measurement, a high-magnification imaging unit (objective lens "LUCPLFLN" (magnification of 20 times, and numerical aperture of 0.40)) is used, a focus is adjusted with the use of polystyrene latex particle #5100A having 1.0 (produced by Duke Scientific Corporation), and then the measurement is performed. A particle sheath "PSE 900A" (produced by Sysmex Corporation) is used for a sheath liquid. The conditions of the auto-sampler are determined to be that amount of dispersing agent to be dispensed is 0.5 mL, amount of particle sheaths to be dispensed is 10 mL, strength of oscillating stirring is 80%, time period of oscillating stirring is 30 seconds, intensity of ultrasonic irradiation is 80%, time period of ultrasonic irradiation is 300 seconds, number of revolution of propeller stirring is 500 rpm, and time period of propeller stirring is 300 seconds. The sample in an amount of 10 ml is weighed out in a beaker for the auto-sampler, and the beaker is set in the auto-sampler. The measuring conditions are set so that the measurement mode is HPF and the total count number is 2000, and the measurement is performed. In the measurement of the present invention, the average circularity and the aspect ratio are analyzed by attached analysis software.

EXAMPLES

The present invention will be described in more detail below with reference to Examples and Comparative Examples, but the present invention is not limited thereto at all. Parts which are used in the Examples are based on mass unless otherwise specified.

Firstly, a Production Example of the toner will be described.

Production Example of Toner 1

(Hydrolysis Process of Organosilicon Compound)

To a reaction vessel equipped with a stirrer and a thermometer, 60.0 parts of ion-exchanged water was weighed, and the pH was adjusted to 4.0 with the use of 10% by mass hydrochloric acid. This liquid was heated to a temperature of 40° C. while being stirred. After that, 40.0 parts of methyl triethoxy silane, which is an organosilicon compound, was added thereto, and the mixture was stirred for 2 hours or longer and was thereby subjected to hydrolysis. When it was visually confirmed that oil and water were not separated but formed a single layer, the state was determined to be the end point of the hydrolysis, and the liquid was cooled to obtain a hydrolysis liquid of the organosilicon compound.

(Process for Preparing Polymerizable Monomer Composition)

Styrene: 60.0 parts

C. I. Pigment Blue 15:3:6.5 parts

The materials were charged into an attritor (manufactured by Mitsui Miike Chemical Engineering Machinery Co., Ltd.) and were further dispersed with the use of a zirconia particle having a diameter of 1.7 mm, at 220 rpm for 5.0 hours, and a pigment dispersion liquid was prepared. The following materials were added to the pigment dispersion liquid.

Styrene: 20.0 parts

N-butyl acrylate: 20.0 parts

Crosslinking agent (divinylbenzene): 0.3 parts

Saturated polyester resin: 5.0 parts (polycondensate of propylene oxide-modified bisphenol A (2 mol adduct) and terephthalic acid (molar ratio 10:12), glass transition temperature Tg=68° C., weight average molecular weight Mw=10000, and molecular weight distribution Mw/Mn=5.12)

Fischer-Tropsch wax (melting point: 78° C.): 7.0 parts

This mixed liquid was kept at 65° C., and the materials were uniformly dissolved and dispersed at 500 rpm with the use of a T. K. homomixer (manufactured by Primix Corporation), and a polymerizable monomer composition was prepared.

(Process for Preparing Aqueous Medium 1)

In a reaction vessel equipped with a stirrer, a thermometer, and a reflux pipe, 14.0 parts of sodium phosphate (Rasa Industries, Inc., dodecahydrate) was added into 650.0 parts of ion-exchanged water, and the vessel was kept warm at 65° C. for 1.0 hour while nitrogen purge was conducted.

While the liquid was stirred at 15000 rpm with the use of T. K. Homomixer (manufactured by Primix Corporation), an aqueous solution of calcium chloride, in which 9.2 parts of calcium chloride (dihydrate) was dissolved in 10.0 parts of ion-exchanged water, was collectively charged into the liquid, and an aqueous medium was prepared which contained a dispersion stabilizer. Furthermore, 10% by mass hydrochloric acid was added to the aqueous medium to adjust the pH to 5.0, and an aqueous medium 1 was obtained.

(Granulating Process)

While the temperature of the aqueous medium 1 was kept at 70° C., and the number of revolution of the T. K. homomixer was kept at 15000 rpm, the polymerizable monomer composition was charged into the aqueous medium 1, and 10.0 parts of t-butyl peroxypivalate that is a polymerization initiator was added thereto. The mixture was granulated in the state for 10 minutes while 15000 rpm in the stirring apparatus was maintained.

(Polymerization and Distillation Processes)

After the granulation process, the stirrer was replaced with a propeller stirring blade; the above mixed liquid was subjected to polymerization for 5.0 hours while the stirring was continued at 150 rpm and the temperature was kept at 70° C.; and after the temperature was raised to 85° C., the liquid was heated for 2.0 hours and thereby was subjected to a polymerization reaction.

After that, the slurry was heated to 100° C. and distilled for 6 hours, thereby an unreacted polymerizable monomer was distilled off, and a dispersion liquid of the toner base particles was obtained.

(Process for Forming Convex Portions X)

After the temperature of the obtained dispersion liquid of the toner base particles was cooled to 55° C., 25.0 parts of the hydrolysis liquid of the organosilicon compound was added to the dispersion liquid as "addition process 1", and a polymerization of the organosilicon compound was started. The mixed liquid was kept in the state for 15 minutes, and then was adjusted to pH=5.5 with an aqueous solution of 3.0% sodium hydrogen carbonate. In the state in which the stirring was continued at 55° C., the mixed liquid was held for 60 minutes as "holding process 1", then the pH was adjusted to 9.5 with the use of an aqueous solution of 3.0% sodium hydrogen carbonate as "pH adjustment 1", and the resultant mixed liquid was further held for 240 minutes as "holding process 2".

Furthermore, the pH was adjusted to 12.0 with an aqueous solution of 1.0 mol/L sodium hydroxide, as "pH adjustment 2". Next, 8.0 parts of methyl triethoxy silane was added to the mixed liquid as "addition process 2", in a state in which stirring was continued at 55° C., the resultant mixed liquid was further held for 180 minutes as "holding process 3", and convex portions X were formed.

After that, the mixed liquid was cooled, and the dispersion liquid of the toner particles was obtained.

(Cleaning and Drying Process)

After the polymerization process has been finished, the dispersion liquid of the toner particles was cooled; hydrochloric acid was added to the dispersion liquid of the toner particles, and the pH was thereby adjusted to 1.5 or lower; the dispersion liquid was left for 1 hour while having been stirred, and then was subjected to solid-liquid separation with a pressure filter; and a toner cake was obtained. This toner cake was reslurried with ion-exchanged water to form a dispersion liquid again, then the dispersion liquid was subjected to solid-liquid separation with the previously described filter, and a toner cake was obtained.

The obtained toner cake was dried in a constant temperature oven at 40° C. for 72 hours, and was further classified; and a toner particle 1 was obtained. In the present Example, the obtained toner particle 1 was not externally added, but was used in the state as a toner 1. Production conditions of the toner 1 are shown in Table 1.

Various physical properties of the obtained toner were measured according to the previously described methods. Results of measured physical properties of the produced toner 1 are shown in Table 2.

Production Examples of Toners 2 to 21, and Comparative Toners 3 to 7

The production conditions in the process for forming convex portions X in the Production Example of the toner 1 were changed as shown in Table 1. Toners were produced in the same manner as in the Production Example of the toner 1, except for the changed conditions.

Production Example of Comparative Toner 1

In the Comparative toner 1, a process of forming convex portions X in the Production Example of the toner 1 was not performed. The toner was produced in the same manner as in the Production Example of the toner 1 except for the different point. The Comparative toner 1 is a toner that does not have convex portions X of the organic silicon polymer on the surface of the toner base particle.

Production Example of Comparative Toner 2

In the process of forming convex portions X in the Production Example of the toner 1, a time period in the holding process 1 was set to 1440 minutes, and the subsequent pH adjustment process 1 and further subsequent processes were not performed; and the liquid was cooled. Thus, a dispersion liquid of the toner particles was obtained. The toner was produced in the same manner as in the Production Example of the toner 1 except for the different point. A Comparative toner 2 is a toner that has an organic silicon polymer on the surface of the toner base particle, but does not have the convex portions X.

TABLE 1

| | Holding process 1 | pH | pH | Addition process 2 | | Holding process 3 |
|---|---|---|---|---|---|---|
| Process Changed conditions | Holding time (minutes) | adjustment 1 pH | adjustment 2 pH | Temperature (° C.) | Number of parts of added methyl triethoxy silane (parts) | Holding time (minutes) |
| Toner 1 | 60 | 9.5 | 12.0 | 55 | 8 | 180 |
| Toner 2 | 40 | 9.5 | 12.0 | 55 | 8 | 180 |
| Toner 3 | 60 | 9.5 | 12.0 | 55 | 8 | 300 |
| Toner 4 | 60 | 9.5 | 12.0 | 55 | 8 | 150 |
| Toner 5 | 60 | 9.5 | 12.0 | 55 | 2 | 180 |
| Toner 6 | 60 | 9.5 | 12.0 | 55 | 100 | 180 |
| Toner 7 | 60 | 8.0 | 12.0 | 55 | 8 | 180 |
| Toner 8 | 60 | 6.5 | 12.0 | 55 | 8 | 180 |
| Toner 9 | 60 | 9.5 | 12.0 | 55 | 4 | 180 |
| Toner 10 | 60 | 9.5 | 12.0 | 55 | 6 | 180 |
| Toner 11 | 65 | 9.5 | 12.0 | 55 | 2 | 180 |
| Toner 12 | 60 | 9.5 | 12.0 | 55 | 28 | 180 |
| Toner 13 | 60 | 9.5 | 12.0 | 55 | 36 | 180 |
| Toner 14 | 60 | 9.5 | 12.0 | 40 | 8 | 180 |
| Toner 15 | 60 | 9.5 | 12.0 | 50 | 8 | 180 |
| Toner 16 | 60 | 9.5 | 12.0 | 65 | 8 | 180 |
| Toner 17 | 60 | 9.5 | 12.0 | 75 | 8 | 180 |
| Toner 18 | 60 | 9.5 | 9.5 | 55 | 8 | 180 |
| Toner 19 | 60 | 9.5 | 10.5 | 55 | 8 | 180 |
| Toner 20 | 60 | 9.5 | 12.5 | 55 | 8 | 180 |
| Toner 21 | 60 | 9.5 | 13.0 | 55 | 8 | 180 |
| Comparative toner Toner 1 | — | — | — | — | — | — |
| Comparative toner Toner 2 | 1440 | — | — | — | — | — |
| Comparative toner Toner 3 | 30 | 9.5 | 12.0 | 55 | 8 | 180 |
| Comparative toner Toner 4 | 60 | 9.5 | 12.0 | 55 | 8 | 600 |
| Comparative toner Toner 5 | 60 | 9.5 | 12.0 | 55 | 8 | 100 |
| Comparative toner Toner 6 | 60 | 9.5 | 12.0 | 55 | 1.2 | 180 |
| Comparative toner Toner 7 | 60 | 9.5 | 12.0 | 55 | 120 | 180 |

TABLE 2

| | On the surface of toner base particle | | Number ratio of convex portions | Migration rate of convex | Migration rate of convex | Particle size of migrated convex | Particle size of migrated convex | | Aspect ratio of migrated | Average circularity of migrated |
|---|---|---|---|---|---|---|---|---|---|---|
| | Organic silicon polymer | Convex portions X | Y P(H/w) (%) | portions X (% by number) | portions X (% by weight) | portions X D1 (nm) | portions X D2 (nm) | D1/D2 | convex portions X | convex portions X |
| Toner 1 | Have | Have | 90 | 15 | 35 | 60 | 30 | 2.0 | 0.5 | 0.82 |
| Toner 2 | Have | Have | 73 | 15 | 35 | 60 | 20 | 3.0 | 0.5 | 0.82 |
| Toner 3 | Have | Have | 90 | 7 | 22 | 60 | 30 | 2.0 | 0.5 | 0.82 |
| Toner 4 | Have | Have | 90 | 18 | 38 | 60 | 30 | 2.0 | 0.5 | 0.82 |
| Toner 5 | Have | Have | 90 | 15 | 28 | 32 | 30 | 1.1 | 0.5 | 0.82 |
| Toner 6 | Have | Have | 90 | 15 | 65 | 290 | 30 | 9.7 | 0.5 | 0.82 |
| Toner 7 | Have | Have | 90 | 15 | 35 | 60 | 30 | 2.0 | 0.5 | 0.82 |
| Toner 8 | Have | Have | 90 | 15 | 35 | 60 | 30 | 2.0 | 0.5 | 0.82 |
| Toner 9 | Have | Have | 90 | 15 | 30 | 45 | 30 | 1.5 | 0.5 | 0.82 |
| Toner 10 | Have | Have | 90 | 15 | 33 | 55 | 30 | 1.8 | 0.5 | 0.82 |
| Toner 11 | Have | Have | 92 | 15 | 27 | 32 | 35 | 0.9 | 0.5 | 0.82 |
| Toner 12 | Have | Have | 90 | 15 | 40 | 140 | 30 | 4.7 | 0.5 | 0.82 |
| Toner 13 | Have | Have | 90 | 15 | 42 | 160 | 30 | 5.3 | 0.5 | 0.82 |
| Toner 14 | Have | Have | 90 | 15 | 35 | 60 | 30 | 2.0 | 0.2 | 0.82 |
| Toner 15 | Have | Have | 90 | 15 | 35 | 60 | 30 | 2.0 | 0.4 | 0.82 |

TABLE 2-continued

| | On the surface of toner base particle | | Number ratio of convex portions | Migration rate of convex | Migration rate of convex | Particle size of migrated convex | Particle size of migrated convex | | Aspect ratio of migrated | Average circularity of migrated |
|---|---|---|---|---|---|---|---|---|---|---|
| | Organic silicon polymer | Convex portions X | Y P(H/w) (%) | portions X (% by number) | portions X (% by weight) | portions X D1 (nm) | portions X D2 (nm) | D1/D2 | convex portions X | convex portions X |
| Toner 16 | Have | Have | 90 | 15 | 35 | 60 | 30 | 2.0 | 0.7 | 0.82 |
| Toner 17 | Have | Have | 90 | 15 | 35 | 60 | 30 | 2.0 | 0.9 | 0.82 |
| Toner 18 | Have | Have | 90 | 15 | 35 | 60 | 30 | 2.0 | 0.5 | 0.64 |
| Toner 19 | Have | Have | 90 | 15 | 35 | 60 | 30 | 2.0 | 0.5 | 0.72 |
| Toner 20 | Have | Have | 90 | 15 | 35 | 60 | 30 | 2.0 | 0.5 | 0.85 |
| Toner 21 | Have | Have | 90 | 15 | 35 | 60 | 30 | 2.0 | 0.5 | 0.92 |
| Comparative toner Toner 1 | Does not have | Does not have | — | — | — | — | — | — | — | — |
| Comparative toner Toner 2 | Have | Does not have | — | — | — | — | — | — | — | — |
| Comparative toner Toner 3 | Have | Have | 65 | 15 | 35 | 60 | 30 | 2.0 | 0.5 | 0.82 |
| Comparative toner Toner 4 | Have | Have | 90 | 3 | 18 | 60 | 30 | 2.0 | 0.5 | 0.82 |
| Comparative toner Toner 5 | Have | Have | 90 | 25 | 44 | 60 | 30 | 2.0 | 0.5 | 0.82 |
| Comparative toner Toner 6 | Have | Have | 90 | 15 | 26 | 25 | 30 | 0.8 | 0.5 | 0.82 |
| Comparative toner Toner 7 | Have | Have | 90 | 15 | 70 | 320 | 30 | 10.7 | 0.5 | 0.82 |

Example 1

The toner 1 was subjected to the following evaluation. The evaluation results are shown in Table 3.

A modified machine of a commercially available laser beam printer LBP7600C manufactured by Canon Inc. was used for the evaluation. As for the modification point, the main body of the evaluation apparatus and software were changed, and thereby the rotation speed of the developing roller was set at such a condition that the developing roller rotated at a peripheral speed as large as 1.8 times, and that the transferability easily was deteriorated by endurance. Specifically, though the rotation speed of the developing roller before modification was a peripheral speed of 200 mm/sec, the rotation speed after modification was set to 360 mm/sec. In addition, the transfer bias was set so as to be capable of being arbitrarily adjusted.

Into the toner cartridge of LBP7600C, 40 g of the toner 1 was charged. Then, the toner cartridge was left in an environment of normal temperature and normal humidity NN (25° C./50% RH) for 24 hours. After having been left for 24 hours in the environment, the toner cartridge was attached to the LBP7600C.

Evaluation of Transferability (Transfer Efficiency)

The transferability was evaluated by the transfer efficiency being determined.

The transfer efficiency is an indicator of transferability, which indicates how much the toner developed on a photosensitive drum has been transferred onto an intermediate transfer belt.

The transferability was evaluated before and after 4,000 sheets of an image having a coverage rate of 35.0% were printed out in a lateral direction of A4 paper in an NN environment, and a change in the transferability before and after endurance was evaluated.

For the evaluation of the transferability, a solid image was output, a transfer residual toner on the photosensitive member at the time when the solid image was formed was taped with the use of a transparent polyester adhesive tape, and was peeled off. A density difference was calculated by subtracting a density of the adhesive tape alone which was stuck on the paper, from the density of the peeled off adhesive tape which was stuck on the paper. Then, from the value of the density difference, the transferability was determined in the following way. For information, the density was measured with an X-Rite color reflection densitometer (X-rite 500 Series, manufactured by X-rite Incorporated). C or higher was determined to be satisfactory.

(Evaluation Criteria)

A: The density difference is smaller than 0.05.

B: The density difference is 0.05 or larger and smaller than 0.10.

C: The density difference is 0.10 or larger and smaller than 0.240.

D: The density difference is 0.240 or larger.

Examples 2 to 19 and Comparative Examples 1 to 7

Evaluation was performed in the same manner as in Example 1 except that the toner was changed to the toners 2 to 19 and the Comparative toners 1 to 7. The evaluation results are shown in Table 3.

TABLE 3

| | Initial stage | | After 4000 sheets of endurance | |
|---|---|---|---|---|
| | Transfer bias 600 V | Transfer bias 150 V | Transfer bias 600 V | Transfer bias 150 V |
| Toner 1 | A (0.015) | A (0.015) | A (0.015) | A (0.018) |
| Toner 2 | A (0.015) | A (0.015) | B (0.062) | C (0.120) |
| Toner 3 | A (0.015) | C (0.200) | A (0.015) | C (0.200) |
| Toner 4 | A (0.012) | A (0.012) | A (0.035) | C (0.220) |
| Toner 5 | A (0.026) | C (0.115) | A (0.026) | C (0.115) |
| Toner 6 | B (0.065) | B (0.070) | C (0.015) | C (0.220) |

TABLE 3-continued

| | Initial stage | | After 4000 sheets of endurance | |
|---|---|---|---|---|
| | Transfer bias 600 V | Transfer bias 150 V | Transfer bias 600 V | Transfer bias 150 V |
| Toner 7 | A (0.040) | B (0.060) | A (0.045) | B (0.080) |
| Toner 8 | B (0.070) | C (0.180) | B (0.080) | C (0.230) |
| Toner 9 | A (0.022) | B (0.060) | A (0.022) | B (0.080) |
| Toner 10 | A (0.040) | A (0.044) | A (0.015) | A (0.048) |
| Toner 11 | B (0.065) | B (0.080) | C (0.105) | C(0.220) |
| Toner 12 | A (0.012) | A (0.012) | B (0.085) | C (0.102) |
| Toner 13 | B (0.065) | B (0.080) | C (0.104) | C (0.180) |
| Toner 14 | B (0.075) | B (0.094) | B (0.090) | C (0.103) |
| Toner 15 | A (0.045) | B (0.064) | A (0.045) | B (0.067) |
| Toner 16 | A (0.035) | A (0.046) | A (0.045) | B (0.060) |
| Toner 17 | A (0.042) | B (0.060) | B (0.052) | B (0.080) |
| Toner 18 | B (0.075) | B (0.094) | B (0.090) | C (0.103) |
| Toner 19 | A (0.045) | B (0.064) | A (0.045) | B (0.067) |
| Toner 20 | A (0.035) | A (0.046) | A (0.045) | B (0.060) |
| Toner 21 | A (0.042) | B (0.060) | B (0.052) | B (0.080) |
| Comparative toner Toner 1 | D (0.260) | D (0.440) | D (0.405) | D (0.680) |
| Comparative toner Toner 2 | B (0.085) | D (0.255) | B (0.085) | D (0.255) |
| Comparative toner Toner 3 | A (0.015) | A (0.015) | C (0.185) | D (0.260) |
| Comparative toner Toner 4 | A (0.015) | D (0.320) | A (0.015) | D (0.320) |
| Comparative toner Toner 5 | A (0.012) | A (0.012) | C (0.155) | D (0.295) |
| Comparative toner Toner 6 | C (0.150) | C (0.200) | D (0.245) | D (0.260) |
| Comparative toner Toner 7 | A (0.010) | A (0.010) | C (0.145) | D (0.270) |

As a result of the evaluation, as shown in Table 3, the toners of the present invention could maintain excellent transferability throughout the endurance, even when the transfer bias was low.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-175016, filed Oct. 16, 2020, which is hereby incorporated by reference herein in its entirety.

What is claimed is:

1. A toner, comprising:

a toner particle comprising a toner base particle, and a plurality of convex portions X existing on a surface of the toner base particle;

each of the convex portions X contains an organic silicon polymer; and the convex portions X comprising a plurality of convex portions Y each having a convex height H of 40 nm or higher when a cross-section of the toner is observed with a scanning transmission electron microscope, wherein the convex portions Y comprise a plurality of convex portions Y2 each having a ratio (H/w) of 0.33 to 0.80 where w is a convex width defined by a maximum line segment in a continuous interface between the toner base particle and each of convex portions X, and convex height H is a maximum length of each of the convex portions X in a normal direction to w, a number ratio P (H/w) of a number of the convex portions Y2 is 70% by number or more with respect to a total number of the convex portions Y, a migration rate of the convex portions X in a water washing method of the toner is 7 to 20% by number of a total of the convex portions X before water washing, and a number average particle size D1 of the convex portions X that have migrated into water by the water washing method is 30 to 300 nm.

2. The toner according to claim 1, wherein 10 or more convex portions X per toner particle are observed by the cross-sectional observation of the toner by scanning transmission electron microscope.

3. The toner according to claim 1, wherein the number average particle size D1 of the convex portions X that have migrated into water by the water washing method is 50 to and 300 nm, and a ratio D1/D2 is 1.0 to 5.0 where D2 is a number average particle size of the convex portions X that migrate into water when the toner which has been subjected to the water washing method is washed again with water.

4. The toner according to claim 1, wherein an aspect ratio of the convex portions X that have migrated into water by the water washing method is 0.3 to 0.8 in a flow type image analysis method, and an average circularity of the convex portions X that have migrated into water by the water washing method is 0.70 to 0.90 in a flow type image analysis method.

* * * * *